United States Patent
Krutzik et al.

(10) Patent No.: US 9,111,621 B2
(45) Date of Patent: Aug. 18, 2015

(54) SOLID STATE DRIVE MEMORY DEVICE COMPRISING SECURE ERASE FUNCTION

(71) Applicant: PFG IP LLC, San Francisco, CA (US)

(72) Inventors: Christian Krutzik, Costa Mesa, CA (US); John Leon, Costa Mesa, CA (US)

(73) Assignee: PFG IP LLC, San Francisco, CA (US)

( * ) Notice: Subject to any disclaimer, the term of this patent is extended or adjusted under 35 U.S.C. 154(b) by 0 days.

(21) Appl. No.: 13/923,310

(22) Filed: Jun. 20, 2013

(65) Prior Publication Data

US 2014/0022849 A1    Jan. 23, 2014

Related U.S. Application Data

(60) Provisional application No. 61/662,096, filed on Jun. 20, 2012.

(51) Int. Cl.
*G11C 16/16* (2006.01)
*G06F 12/00* (2006.01)
*G11C 16/22* (2006.01)
*G06F 21/80* (2013.01)

(52) U.S. Cl.
CPC .............. *G11C 16/16* (2013.01); *G06F 21/80* (2013.01); *G11C 16/22* (2013.01); *G06F 2212/7205* (2013.01); *G06F 2221/2143* (2013.01)

(58) Field of Classification Search
CPC ............ G11C 16/16; G06F 2212/7205; G06F 2221/2143
USPC .................. 365/185.33, 185.29; 711/E12.001
See application file for complete search history.

(56) References Cited

U.S. PATENT DOCUMENTS 5,568,423 A * 10/1996 Jou et al. .................. 365/185.33
6,148,362 A * 11/2000 Sagi .............................. 711/102

\* cited by examiner

*Primary Examiner* — Ly D Pham
(74) *Attorney, Agent, or Firm* — Thomas M. Freiburger (57) ABSTRACT

A memory device such as a solid state memory device have a dual-hardware, secure erase feature. A memory controller operating in a memory controller domain provides general memory management and interface operons. Upon receipt of a trigger signal which may be received from a secure supervisor circuit, a separate processor element that is configured to directly access the raw memory cells in the device bypasses the memory controller domain and executes a separately provided secure erase operating system whereby the raw cell data may be erased and rewritten with a predetermined data pattern and whereby the erase operation at the raw cell level may be verified and reported to the user by the processor.

2 Claims, 6 Drawing Sheets

SOLID STATE DRIVE MEMORY DEVICE COMPRISING SECURE ERASE FUNCTION

CROSS-REFERENCE TO RELATED APPLICATIONS

This application claims the benefit of U.S. Provisional Patent Application No. 61/662,096, filed on Jun. 20, 2012 entitled "Solid State Drive Memory Device Comprising Secure Erase Function" pursuant to 35 USC 119, which application is incorporated fully herein by reference.

STATEMENT REGARDING FEDERALLY SPONSORED RESEARCH AND DEVELOPMENT

N/A

BACKGROUND OF THE INVENTION

1. Field of the Invention

The invention relates generally to the field of memory devices. More specifically, the invention relates to a solid state memory device in which memory contents are securely erasable upon a predetermined trigger event.

2. Description of the Related Art

It is known that data stored in flash memory such as NAND flash memory can later be recovered by an unauthorized user in the form of "remnant data", even after data is deleted by the authorized user. Therefore, commercial and government users of solid state drives ("SSD") have a need to "sanitize", i.e., render unrecoverable, data such as cryptographic keys stored in flash memory cells.

What is needed is a device and method that provides the ability to store encrypted data and encryption keys in a NAND flash memory device and that provides the user with the assurance that an erase command will render all data in the device unrecoverable. The sanitizing erase operation must address each and all NAND flash cells in the device, including any bad blocks, spare areas, overprovisioning, reserved/hidden partitions, etc.

To address the above concern, a device and method are provided where the erase is performed outside of the SSD controller domain and is therefore not subject to any address remapping, data scrambling, or hidden zones within the cells of the flash memory storage device.

A typical prior art SSD controller uses "abstraction layers" when mapping physical-to-logical blocks in the flash memory which basically map address locations known to the flash controller operating system or "OS" to actual address locations in the flash cell arrays for memory management and usage, which management may include wear-leveling, bad block management, data consolidation, ECC, logical-physical address mapping, and data scrambling.

Prior art file systems in flash memory controllers further abstract data storage with allocation nodes/tables and mapping. Yet further, there is an abstraction layer in the flash device itself in terms of cell array address mapping, MLC (multi-level cell) design, and MLC data decoding.

Through these abstraction layers, user data is modified, relocated, and/or reconstructed in a distributed manner such that no single point in the flash hardware can directly map user data to a physical cell location. Certain flash memory data modification is purely hardware-controlled and cannot be tracked or observed by the external system. For example, wear-leveling algorithms move data around the flash cells and as a result, effectively leave multiple copies of the data in the flash cells. This makes it difficult to control the exact behavior desired at a physical or "raw" cell level needed to maximize the effectiveness of data destruction or to effectively destroy any data remnants in the cells.

The instant invention addresses the above concerns and deficiencies by providing direct raw flash cell access using a separately-provided processor element executing a dedicated secure erase operating system that bypasses and overrides the SSD controller management functions during an erase mode, thus permitting direct, unencumbered access to every flash cell in the device.

Because this dual-hardware device and method of the invention fully bypasses the flash memory controller of a prior art flash memory device, the algorithms and erase techniques are controlled by the separate processor and OS, not by the flash memory controller, and are thus not subject to vendor code modifications or bug.

Another issue present in prior art SSD devices that perform an ATA Secure Erase operation is that the user merely receives an acknowledgment that the erase operation is complete. In many cases this is just a command-line executable that provides little to no feedback to the user.

Information as to how the drive performed the erase, what data was physically erased (e.g. just the key, or all data), what data was erased (e.g. is the over-provisioning area erased), and how the drive verified the erase (e.g. did it just initiate a raw erase command to flash and then assume it's erased) is not conveyed to the user in prior art systems.

In order to provide the end-user with assurance that the erase was fully-executed and that no data remnants remain, that it was successfully run, and that all flash blocks were erased, the invention herein preferably comprises a secure erase assurance operating system function as a built-in OS that resides in the separate hardware processor element within the secure drive.

The separately-provided secure OS is protected as a read-only memory and is only used as a reporting tool; the erase function of the device may be performed with or without a reporting display.

Upon initiation of a secure erase command, the user can reboot the PC and automatically enter the secure operating system which may be configured to report back full status of erase progress and status and display of a map of the entire drive to identify, down to the physical block level of the NAND cells, any blocks with data that are not erased or configured such that the secure OS mode will not exit until flash cells in the drive are fully erased.

BRIEF SUMMARY OF THE INVENTION

In a preferred embodiment, the device is configured as a mini-PCIe card with a secure erase function provided in a housing with a suitable adapter or as a USB storage device. The device may be configured to perform quick erase, military erase, NSA erase and have progress and verification with optional image restore capability.

A trigger event is used to execute the erasure of the contents of the memory which may be in the form of a manual trigger (e.g., push button or switch), a software command (after a predetermined time period or execution of a predetermined instruction set) or a signal from a sensor or secure supervisor circuit that is configured to send an erase trigger signal in response to a predetermined event (e.g., an anti-tamper sensor output).

The predetermined event may include, by way of example and not by limitation, a trigger in response to vibration, a GPS-based trigger, a change in an electrical characteristic, (clock, voltage, current, power level change), a breach of an anti-tamper enclosure or trace, a temperature change, or any combination thereof.

In response to the trigger signal, a zeroization may performed on the flash memory contents by first deleting any internal encryption keys stored in the flash memory controller device within seconds of a trigger. Upon this first key deletion, all data stored within the device flash memory cells remains protected by the AES-256 encryption provided by the flash memory controller. The first key deletion is then followed by a predetermined erase operation such as a standard military or NSA erase algorithm to thoroughly scrub or sanitize the drive of existing encrypted data.

These and various additional aspects, embodiments and advantages of the present invention will become immediately apparent to those of ordinary skill in the art upon review of the Detailed Description and any claims to follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

The invention and its various embodiments can now be better understood by turning to the following detailed description of the preferred embodiments which are presented as illustrated examples of the invention defined in the claims.

It is expressly understood that the invention as defined by the claims may be broader than the illustrated embodiments described below.

DETAILED DESCRIPTION OF THE INVENTION

A secure frilly erasable flash memory device and method for same is provided by the invention as is depicted in FIGS. 1-6.

In a first aspect of the invention, a flash memory device 1 having a secure erase function is provided comprising a flash memory element comprising an array of flash memory cells 5 which may comprise a plurality of NAND flash memory cell arrays.

A flash memory controller element 10 such as a Sandforce SF2300 SSD Processor circuit is provided that is configured to operate in a flash memory controller domain and may have a first encryption function and first encryption key, a flash management function and flash translation layer ("FTL"), a block management function and a wear-leveling function.

The flash memory controller is configured for accessing the flash memory element and for communicating and interfacing with an external electronic device such as a SATA interface communicating with a host computer system.

The first aspect further comprises a separate processor element 15 configured to operate outside of the flash memory controller domain and may comprise a second encryption function and a second encryption key. The second encryption key may be stored in a secure supervisor chip or circuit such as a Maxim Secure Supervisor DS3655.

The processor element may be configured to receive a trigger signal from any source, such as a manual or system-generated trigger signal such as a signal from an anti-tamper sensor or circuit.

The trigger signal initiates the steps of overriding and bypassing the flash memory controller management functions whereby the processor element bypasses the flash memory controller, first erasing the first encryption key and is configured for providing direct processor access to, and erasure of the contents of the flash memory cells by the processor and its dedicated, separately provided secure erase operating system.

The processor element is configured to receive the trigger signal and then to bypass the flash memory controller domain that would normally perform address translation layers, over-provisioning, bad block remapping, and other flash management methods that prevent or interfere with direct flash memory cell access to permit raw cell erasure and overwriting by the processor element.

The secure erase operating system may be configured to perform a user-defined set of data remnant removal operations including multiple data erase and data overwrite operations of data in the flash cells at the raw flash cell level.

In a second aspect of the invention, a method for securely erasing the contents of a flash memory element is disclosed comprising the steps of providing a flash memory controller element having an FTL operation that operates in a flash memory controller domain, providing a flash memory element comprising an array of flash memory cells managed by the controller in the flash memory controller domain, providing a separate processor element operating outside of the flash memory controller domain, storing electronic data and a first encryption key in the flash memory cells.

The flash memory controller domain is then bypassed and overridden by the processor element upon receipt of a trigger signal, erasing the first encryption key using the processor element, which then directly accesses the electronic data in the flash memory cells and, erasing or overwriting, or both erasing and overwriting, the electronic data contents of the cells with the processor element using a separately provided secure erase operating system executed by the processor element.

The data in the raw flash cells may be erased and rewritten using the processor element using user-defined data patterns in a specified number of repeated cycles to ensure no data remnants remain in the cells. The erasure and rewrite operations at the raw flash cell level may be verified and reported to the user using the processor element and the secure erase operating system executed thereby.

The raw flash cell erasure method is based on having unblocked flash cell access by the processing element and direct access to, but not limited to, a low-level flash memory erasure and writing user-defined flash memory patterns including complementary, random, address-specific patterns targeted in specific manners to address the physical proximity of flash cells within the silicon flash device along with bit-level specific patterns targeted to SLC-, MLC-, TLC-type flash cells for optimizing the physical flash cell storage voltage level changes to minimize remembrance effects within the individual cells.

The erase verification method may comprise direct readout of raw flash memory cells by the processing element with hardware verification and error tracking displayed for user feedback.

The secure erase operation may further comprise the process steps of restoring the solid state drive to a "factory state" including the restoration of predetermined SSD features as determined by current state-of-art including firmware, bad blocks, grown bad blocks, SMART tables, and power cycles in a manner that is verified by a checksum.

The device is preferably configured to return the flash memory element management in the device to the flash memory controller domain and operation after complete restoration and erase verification.

Turning now to FIGS. 1-6 wherein like references define like elements among the several views, Applicant discloses a solid state memory device with a secure erase function in response to a predetermined event such as in response to an electronic signal or trigger representative of a tamper attempt by an unauthorized user.

FIGS. 1-6 illustrate exemplar alternative embodiments of the secure erase memory module using a dual-hardware SSD approach wherein a separately-provided processor element is configured to bypass the flash memory controller element in a prior art SSD architecture and to directly access the raw physical flash cells for erase, overwrite and verification functions.

Applicant's invention, which, in a preferred embodiment, may be in the form of a portable USB solid state drive ("SSD") or mini-PCIe solid state card with secure erase function, addresses the existing need for data security and enhanced data protection and destruction in an electronic memory or flash memory device.

This is accomplished utilizing dual hardware-based encryption engines; one using an a first encryption standard such as an AES-256 encryption standard and one using a second encryption standard such as an AES-128 encryption standard, in order to "scramble" drive data to support instant virtual erase by key destruction.

An overall encryption level of AES-300 is thus achieved with this unique architecture. The secure SSD of the invention provides full support for multiple verifiable military erase algorithms. Read and write speeds up to 250 MB/sec are achievable and the mPCI2 SSD form factor is well-suited for laptop computer installations. The instant invention complies with Serial ATA III standard interfaces and is suitable for data storage media and code storage for embedded systems and boot disks.

To enhance data protection, Applicant's secure drive provides rapid zeroization and data scrubbing algorithms that are compatible with existing military and NSA standards. Custom erase algorithms may also be programmed at the factory. Applicant's secure SSD utilizes an "always-on" AES-256 encryption with internally-generated and protected keys, enabling the secure SSD to provide an almost instant response to a data destruction trigger signal.

The data destruction or "zeroization" may be accomplished by first deleting any first internal keys in the flash memory controller within seconds of a receipt of a trigger signal by the processor. Upon key deletion, all data stored within the device memory remains protected by the AES-256 encryption. Key deletion is then followed by a predetermined erase such as a standard military or NSA erase algorithm to thoroughly scrub the drive of existing encrypted data.

To permit run-time validation and erase progress feedback, the invention may be provided with an application-specific erase operating system in the form of a secure erase assurance operating system or "SEAOS" which resides in fully-isolated hardware within the device.

SEAOS may be configured to provide a real-time erase progress screen that runs outside of any operating system installed on the computer in which the invention is installed. Each zeroization write pattern is preferably checked by a 100% read-back with results displayed in real-time to the user. Furthermore, through SEAOS, the secure SSD of the invention can be removed if desired to perform pattern verification using third party low-level drive tools.

Once a military erase is initiated in the invention, the drive is configured so that it cannot return to a useable, i.e., operational state until all erase and verification steps have been completed (regardless of power-down, removal, etc.). The user interface also displays a final pass/fail result providing positive confirmation of a successful military erase procedure.

An exemplar military erase process may be performed in the following preferred sequence:

A push button or software trigger such as from an anti-tamper sensor is initiated to commit an erase command by the separate processor element.

Immediately after a trigger signal, the processor bypasses the flash memory controller and destroys all internal cryptographic keys in the memory controller, resulting in an immediate equivalent AES-300 protection on existing data in the physical memory cells. Overall, this step requires less than about four seconds to complete. After first key erasure, the processor then performs the configured erase protocol across the all data in the memory cells and has direct physical access to them.

In order to verify the erase procedure is complete, the host PC should be power-cycled as the existing OS may become unstable due to data destruction. Upon reboot, the PC is configured to enter into the provided SEAOS executed by the processor element, providing erase progress and verification.

Figure 1:
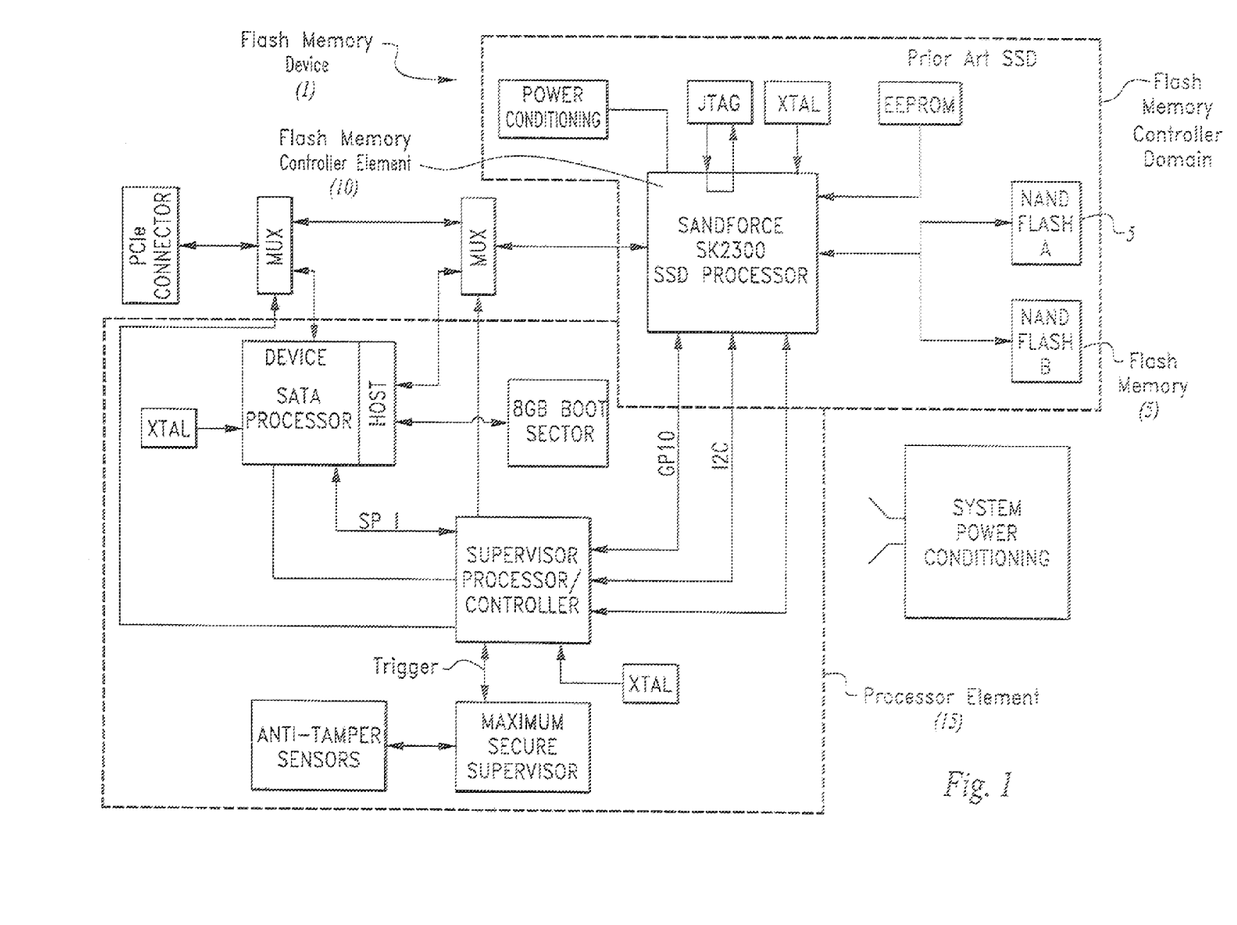
FIG. 1 is a block diagram of a preferred embodiment of the secure memory device of the invention.
Figure 2:
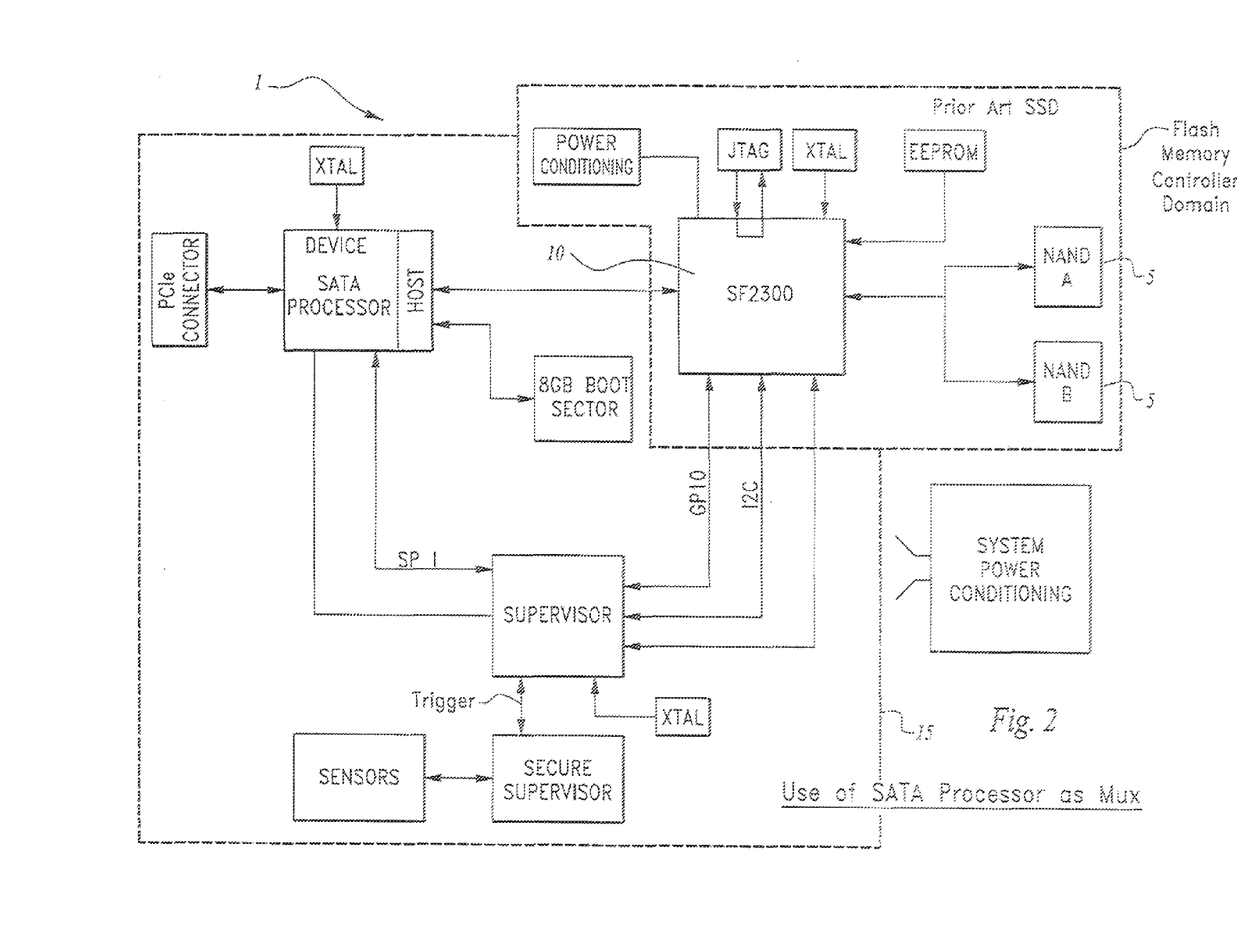
FIG. 2 is a block diagram of a preferred embodiment of the secure memory device of the invention using the SATA processor as a multiplexer element.
Figure 3:
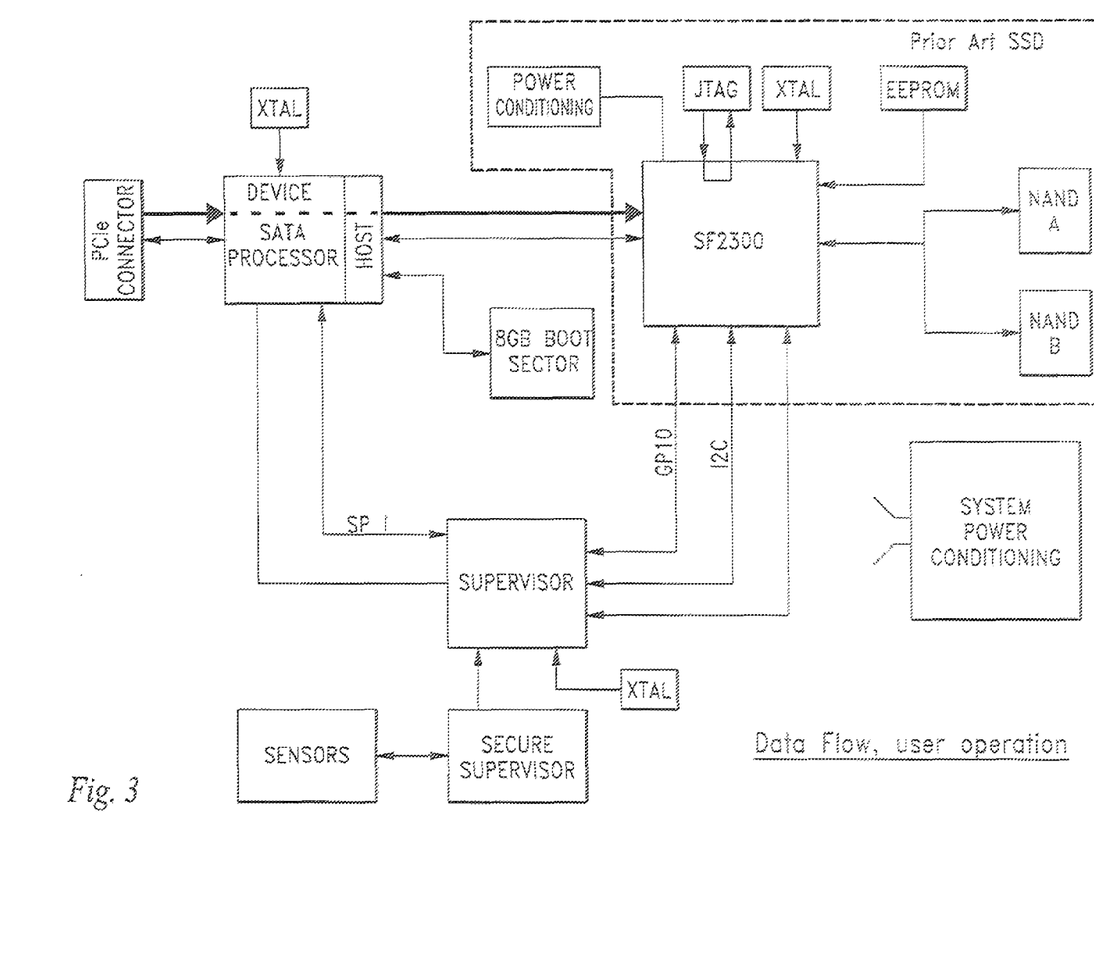
FIG. 3 is a block diagram of a preferred embodiment of the secure memory device of the invention showing a data flow therein.
Figure 4:
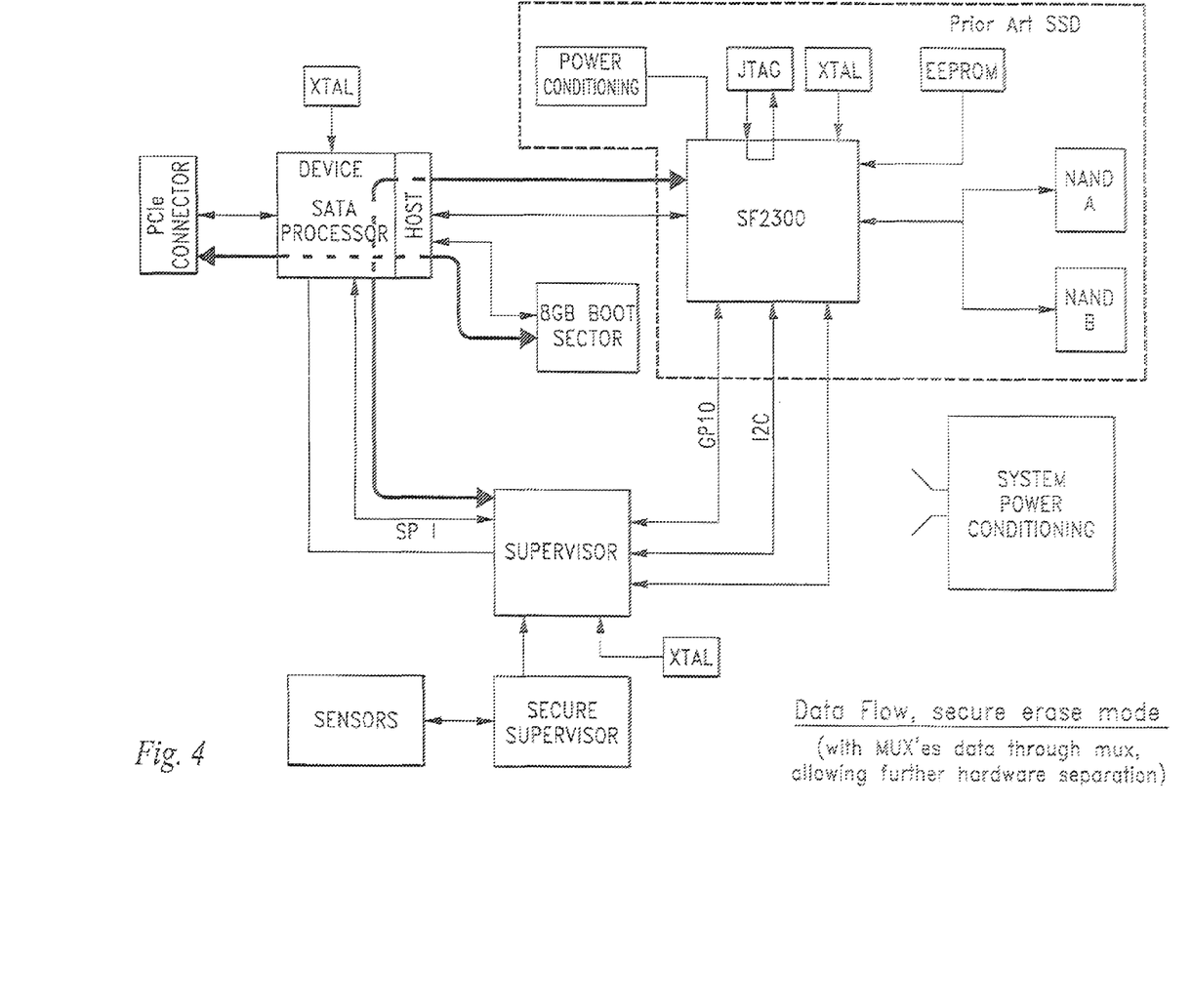
FIG. 4 is a block diagram of a preferred embodiment of the secure memory device of the invention showing a data flow in a secure erase operation.
Figure 5:
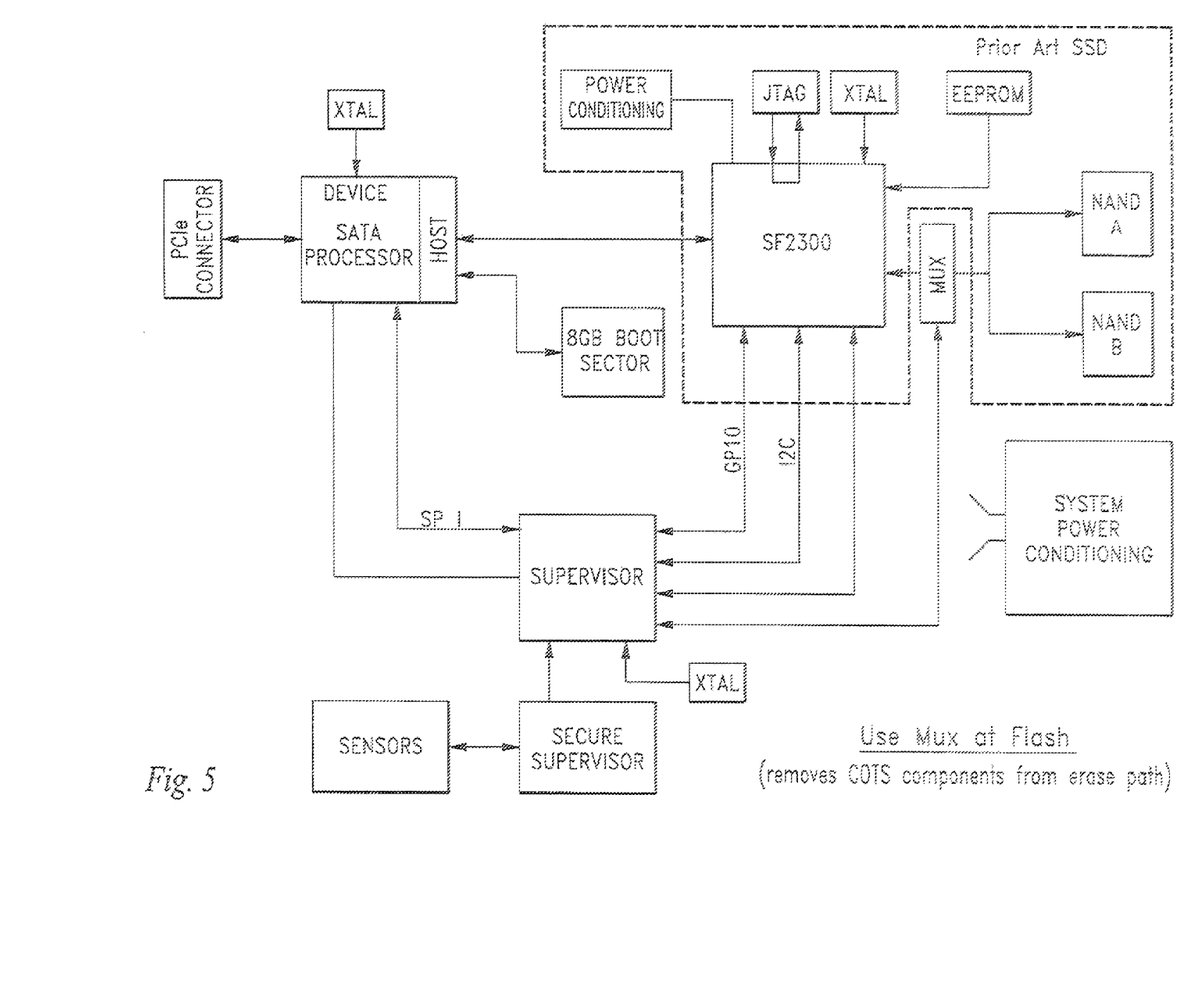
FIG. 5 is a block diagram of an alternative preferred embodiment of the secure memory device of the invention.
Figure 6:
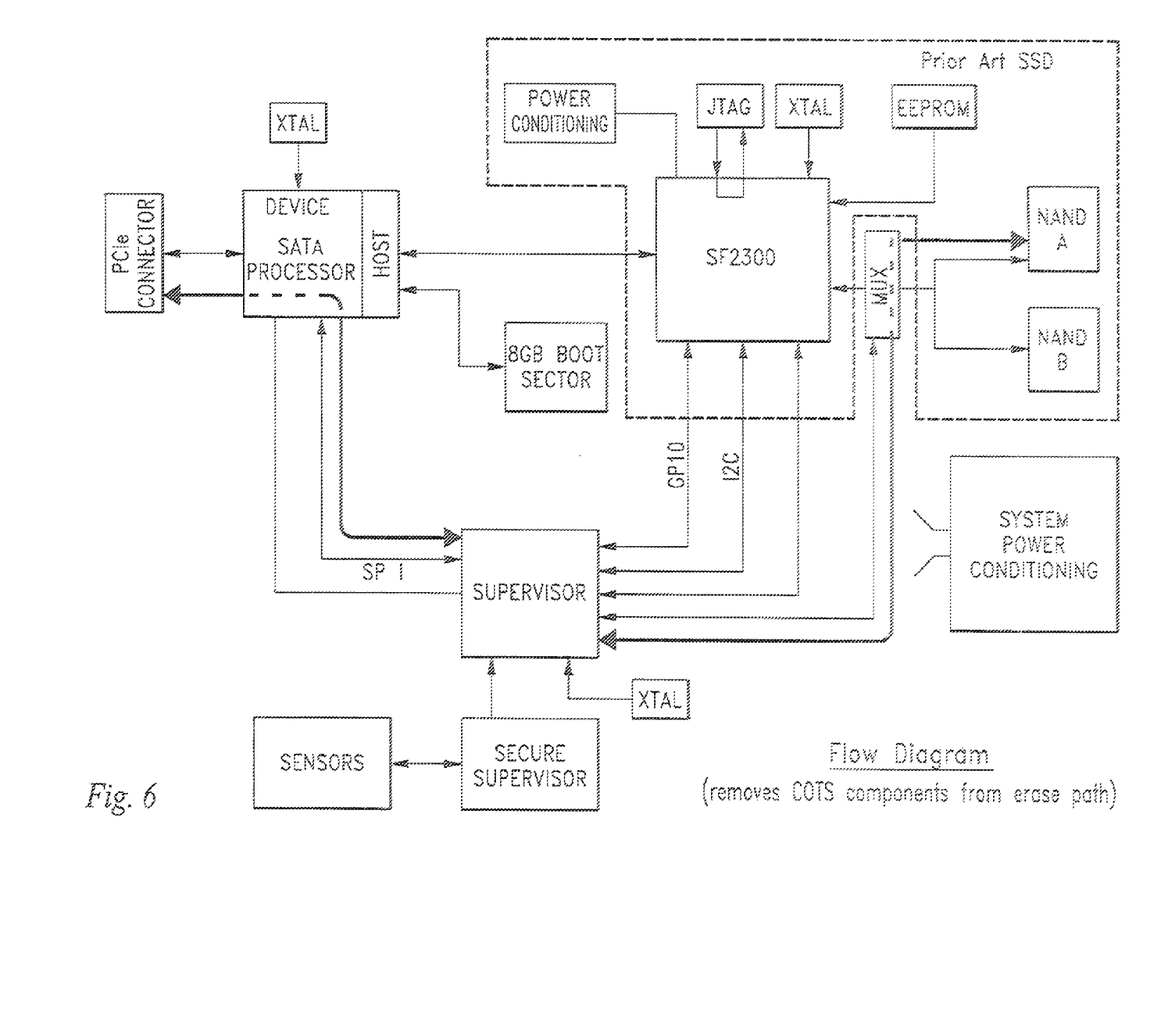
FIG. 6 is a block diagram of a preferred embodiment of the secure memory device of the invention showing a data flow therein and bypassing commercial off the shelf components in the SSD.

As best illustrated in FIG. 6, the illustrated flow provides additional benefits of allowing direct data write/erase. This in turn guarantees that a data pattern and its inverse can be written which addresses a deficiency in the prior at, i.e., the "problem" with standard flash memory controllers wherein they are configured to scramble data (e.g., using AES).

This is performed, not necessarily for security but rather to randomize the data to solve an inherent problem with flash memory that can be optimized by minimizing the number of adjacent 0's in a block which is known to generate flash read disturb errors. As a result, if a user attempts to write a data pattern and its inverse (i.e., to flip each cell from 1 to 0 or vice versa), the inherent flash scrambling architecture will disrupt this such that going through the flash memory controller, one cannot guarantee that data and its inverse are actually written. By bypassing this approach using the separate processor element and SEAOS architecture of the invention, the user can write direct patterns to flash cells, unimpeded by the flash memory controller.

The SSD flash controller of the device may desirably be configured to auto-negotiate PCIe 6 Gb/s, 3 Gb/s and 1.5 Gb/s interface speeds. This enables the SSD to take advantage of the high speed PCIe interface and deliver the performance that maximizes the throughput of a 6 Gb/s interface with a balanced read/write performance.

A set of general specifications for a preferred embodiment of the device of the invention are set forth below:

1. 64 GB or 128 GB mini-PCIe SSD expansion cards with optional 256 GB and 512 GB embodiments,
2. eMLC NAND (30,000 read/write cycles),
3. Write endurance >10 yrs@525 GB write/day,
4. Always active dual AES-256+AES-128 encryption using internally generated and held password,
5. Self-destruct zeroization trigger input,
6. Anti-tamper detection sensors and mitigation,
7. 64 GB additional read-only secure image for effortless secure restore,
8. Supports multiple military and NSA erase algorithms,
9. User-configurable erase/scrub algorithms,
10. PCIE-III interface, backwards compatible,
11. Customizable anti-tamper sensors options,
12. PCIe user interface for providing feedback of secure erase progress and pattern verification.

The invention is preferably configured to support the ATA (Advanced Technology Attachment) commands described below:
EXECUTE DEVICE DIAGNOSTIC
FLUSH CACHE
IDENTIFY DEVICE
READ DMA
READ SECTOR(S)
READ VERIFY SECTOR(S)
SEEK
SET FEATURES
WRITE DMA
WRITE SECTOR(S)
READ MULTIPLE
SET MULTIPLE MODE
WRITE MULTIPLE The invention is preferably configured to support the following optional commands:
READ BUFFFER
WRITE BUFFER
NOP
DOWNLOAD MICROCODE The invention is preferably configured to support the following power management command set:
CHECK POWER MODE
IDLE
IDLE IMMEDIATE
SLEEP
STANDBY
STANDBY IMMEDIATE The device of the invention provides at least the following benefits:

The "dual SSD" hardware approach permits positive segregation of user data from SEAOS. They are separated at the hardware level.

The separate processor element is responsible for the erase function—this means that SEAOS does not need to operate and the drive does not need to be plugged into a PC (i.e., it is not the PC processor doing the erase but the internal processor-the drive is fully self-contained). This also means that SEAOS cannot be corrupted, crash, etc., causing an erase malfunction. Desirably, there is no way to "hack" the system from SEAOS—it is purely a status update; there is no hardware access and therefore no software method to stop or halt the erase operation once it is initiated.

By having the processor element independently perform the erase functions when configured as an internal element of the solid state drive of the invention, the drive is also able to keep an internal log of all actions. For example, the processor may be configured to store a date/time when erased (either by a PC system clock or by means of an internal real-time clock or both), the number of times erased, the number of attempts to power cycle, number of tamper events, pass/fail results, amount of data erased, amount of drive read/writes/usage at time of erase, etc. The logs may be stored separately from flash memory (e.g., in a supervisor or external EEPROM). This overcomes a deficiency in prior art logging methods that utilize a log using the PC itself where the PC may not be aware of what events are occurring).

Upon an erase trigger, the drive "locks" itself into erase mode until finished. This is achieved by synchronizing SEAOS with the processor element. Public/private keys or simply hash functions can be used—e.g.; only on SEAOS completion will the processor element be provided with an "erase complete" signature on challenge from the processor element. Any power cycles, restarts, etc. and the erase mode will resume.

Hash functions are used to mark/certify SEAOS (standard digital signatures, etc.). Keys are preferably held in a secure supervisor circuit which provides anti-tamper protection.

The device architecture can further be used to provide a restore function. The dual-hardware SSD of the invention permits storing an image of the drive with non-sensitive data.

The data may be encrypted using an AES-256 with keys held in a secure supervisor chip such as is available from Maxim with anti-tamper functions.

The SATA processor of the invention images the drive from the "boot sector" to the main SSD after secure erase. This provides a fresh and known start point.

The SATA processor of the processor element may be provided to perform additional AES-256 encryption/decryption. The second keys are loaded by the supervisor and stored in the secure supervisor of the invention.

The invention is preferably configured to support the following security command sets:
SECURITY SET PASSWORD
SECURITY UNLOCK
SECURITY ERASE PREPARE
SECURITY ERASE UNIT
SECURITY FREEZE LOCK
SECURITY DISABLE PASSWORD The invention is preferably configured to support the SMART command set:
SMART ENABLE OPERATIONS
SMART DISABLE OPERATIONS
SMART ENABLE/DISABLE AUTOSAVE
SMART RETURN STATUS The invention is preferably configured to support the following optional commands:
SMART EXECUTE OFF-LINE IMMEDIATE
SMART READ DATA
SMART READ LOG
SMART WRITE LOG The invention is preferably configured to support the following Data Set Management command set Trim attribute:
DATA SET MANAGEMENT EXT The invention is preferably configured to support the following Host Protected Area command set:
  READ NATIVE MAX ADDRESS
  SET MAX ADDRESS
  READ NATIVE MAX ADDRESS EXT
  SET MAX ADDRESS EXT The invention is preferably configured to support following optional commands:
  SET MAX SET PASSWORD
  SET MAX LOCK
  SET MAX FREEZE LOCK
  SET MAX UNLOCK The invention is preferably configured to support the 48-bit Address command set:
  FLUSH CACHE EXT
  READ DMA EXT
  READ NATIVE MAX ADDRESS EXT
  READ SECTOR(S) EXT
  READ VERIFY SECTOR(S) EXT
  SET MAX ADDRESS EXT
  WRITE DMA EXT
  WRITE MULTIPLE EXT
  WRITE SECTOR(S) EXT
  WRITE UNCORRECTABLE EXT The invention is preferably configured to support the following Device Configuration Overlay command set:
  DEVICE CONFIGURATION FREEZE LOCK
  DEVICE CONFIGURATION IDENTITY
  DEVICE CONFIGURATION RESTORE
  DEVICE CONFIGURATION SET The invention is preferably configured to support the following General Purpose Log command set:
  READ LOG EXT
  WRITE LOG EXT The invention is preferably configured to support the following Native Command
  Queuing (NCQ) command set:
  READ FPDMA QUEUED
  WRITE FPDMA QUEUED The invention is preferably configured to support the SET FEATURES parameter to enable/disable the preservation of software settings.

The invention is preferably configured to support the SET FEATURES parameter to enable Device Initiated Power Management.

The SEAOS SSD erase process of the invention is beneficially not subject to address remapping and data abstraction layers inherent in all SSD controllers. For this reason, the SEAOS is capable of accessing all flash cells directly to execute erase/write/read cycles. The SEAOS-SSD thus supports any military erase protocol and can apply true data/data-complement patterns at the flash level (that insures each cell in flash is toggled). The SEAOS user interface is preferably configured to display the result of bit-toggle (BT) as a color coded map for easy viewing by an end-user. Any flash areas that are not erased will clearly be identified allowing the end user to take appropriate action.

The SEAOS-SSD thus provides a unique method of deleting all data in a SSD and verifying the erase. SEAOS provides a bootable user interface that displays progress and verified status of the erase protocol. Also, through SEAOS, once the drive is triggered to erase, the user data becomes inaccessible via the SATA port (even across power cycles, etc.) until the erase procedure completes.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A flash memory device comprising a secure erase function comprising:
  a flash memory element comprising an array of flash memory cells,
  a flash memory controller element operating in a flash memory controller domain, the flash memory controller element configured for memory management of the flash memory cells and for communicating with an external electronic device, and,
  a processor element configured to operate outside of the flash memory controller domain,
  the processor configured to receive a trigger signal and initiate steps comprised of bypassing the flash memory controller and flash memory controller domain and directly accessing and erasing a contents of the flash memory cells, the contents including a first encryption key used by the flash memory controller.

2. A method for securely erasing a contents of a flash memory element comprising the steps of:

providing a flash memory controller element that operates in a flash memory controller domain,
providing a flash memory element comprising an array of flash memory cells operating in the flash memory controller domain,
providing a processor element configured to operate outside of the flash memory controller domain and to directly access the memory cells,
storing electronic data in the flash memory cells, the electronic data including a first encryption key used by the flash memory controller,
bypassing the flash memory controller domain with the processor element upon receipt of a trigger signal,
directly accessing the electronic data in the flash memory cells with the processor element, and,
erasing or rewriting the electronic data with the processor element.

* * * * *